United States Patent [19]

Wysk et al.

[11] 4,346,316
[45] Aug. 24, 1982

[54] APPARATUS FOR RETROFITTING AN EXISTING STEAM GENERATOR WITH AN MHD TOPPING UNIT

[75] Inventors: Stanley R. Wysk, Suffield; Mark Palkes, Glastonbury, both of Conn.

[73] Assignee: Combustion Engineering, Inc., Windsor, Conn.

[21] Appl. No.: 150,834

[22] Filed: May 19, 1980

[51] Int. Cl.³ ............................................. G21D 7/02
[52] U.S. Cl. ...................................................... 310/11
[58] Field of Search ......................................... 310/11

[56] References Cited

U.S. PATENT DOCUMENTS

| | | | |
|---|---|---|---|
| 3,281,614 | 10/1966 | Lindley et al. | 310/11 |
| 3,337,759 | 8/1967 | Daman | 310/11 |
| 3,355,609 | 11/1967 | Horn et al. | 310/11 |
| 3,467,842 | 9/1969 | Carrasse | 310/11 |
| 3,546,499 | 12/1970 | Somers | 310/11 |
| 4,163,910 | 8/1979 | Matthews et al. | 310/11 |

*Primary Examiner*—Donovan F. Duggan
*Attorney, Agent, or Firm*—Arthur L. Wade

[57] ABSTRACT

A magnetohydrodynamic topping unit is added to a pre-existing fossil fuel steam generating plant by a system of conduits and a chamber which show the high velocity output gas of the generator, attenuate oxides of nitrogen, reduce the temperature of the channel output gas, and initiate recovery of seed material. The connecting system is arranged to recover heat from the output gas of the MHD channel by absorbing this heat in the feed water system of the steam generator. The addition of the MHD channel to the existing steam generator provides an alternate source of heat for the steam generator.

7 Claims, 7 Drawing Figures

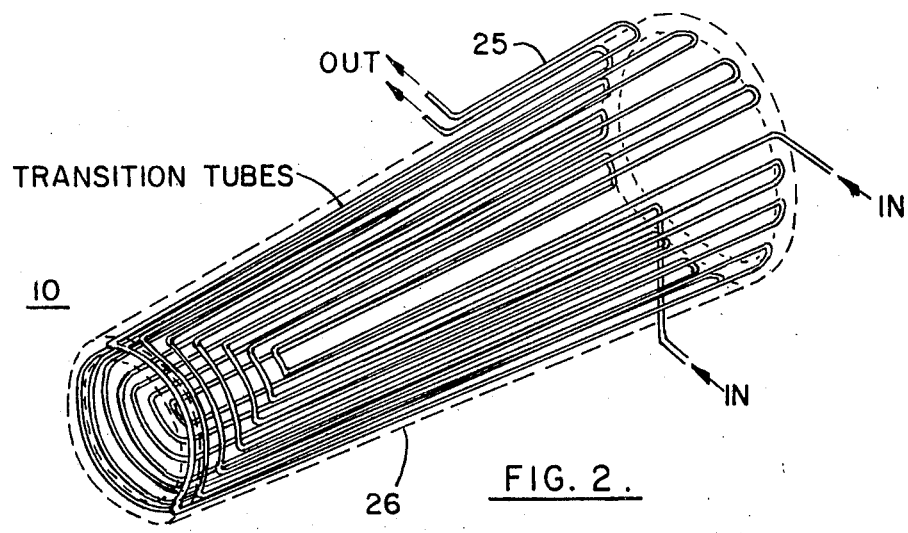
FIG. 2.
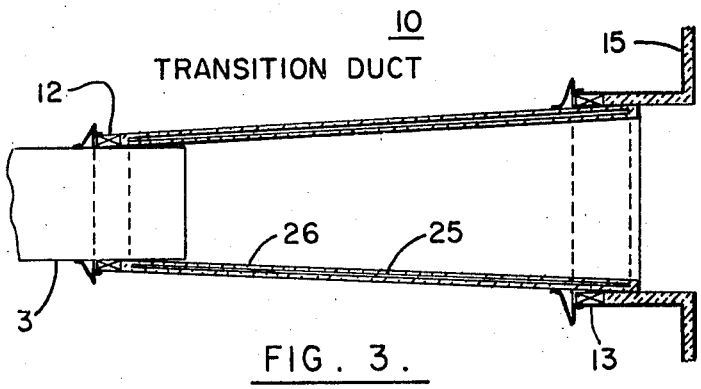
FIG. 3.
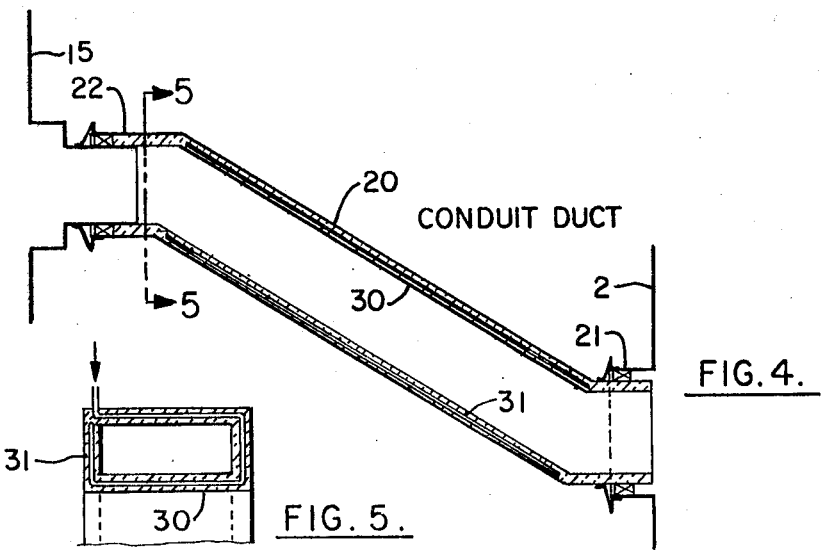
FIG. 4.
FIG. 5.

APPARATUS FOR RETROFITTING AN EXISTING STEAM GENERATOR WITH AN MHD TOPPING UNIT

TECHNICAL FIELD

The present invention relates to the conduit connection between an MHD channel and a pre-existing steam generator suitably modified to receive the output of the MHD channel through the conduit system. More specifically, the invention relates to the arrangement and form of the components of a connecting conduit system which will process the MHD channel gas and insert the gas into the pre-existing steam generator as a source of heat for generation of the steam.

BACKGROUND ART

U.S. Pat. No. 4,163,910 Matthews, et al, issued Aug. 7, 1979, is specifically incorporated in this disclosure by reference. The Matthews patent clearly discloses an MHD channel connected to the bottom of a steam generator of more or less conventional form. The invention in the incorporated disclosure relates to the recovery of heat for superheating fluids utilized by the MHD channel. The patent recognized a problem of directing the high velocity output gas of the MHD channel into the steam generator. A lower chamber was provided for the generator to reduce the velocity of the MHD output gas and to collect and remove slag. Thus, the connection between the MHD channel of the incorporated disclosure and the steam generator did not solve all of the problems related to coupling an MHD channel and a conventional generator.

The general function of the MHD channel is fairly well established in the prior art. Essentially, the MHD channel fuel and air are combusted into working fluid. At a sufficiently high temperature, the working fluid together with an ionizing seed, becomes a generating conductor which is passed through a static magnetic field at velocities which include supersonic speeds. The induced currents are collected by suitably placed electrodes from which direct current is connected to an external load. It is an object of all these combinations of MHD channels and steam generators to significantly increase the fuel conversion efficiency.

The high velocity gas output from the MHD diffuser is usually in a temperature range including 3800 F. It is necessary to provide a residence for the MHD channel gas during which the reducing conditions in the gas attenuate $NO_x$. In addition to $NO_x$ attenuation, the channel gas temperature approach to the retrofitted utility steam generator must be compatible with the design temperature of the generator. At the same time, it is, of course, desirable to provide for the recovery of heat released by the temperature reduction of the gas between the MHD channel and the steam generator. Finally, the seed of the MHD channel must be recovered in a flow-train of stations in the steam generator.

DISCLOSURE OF INVENTION

The present invention contemplates a three-part connecting conduit system between an MHD channel and a pre-existing steam generator. The first part of the conduit system is embodied in a water-cooled transition conduit given the form and arrangement to provide an increasing volume in the direction of the flow of gas from the MHD channel. The transition conduit is connected to a chamber sized to provide dwell time in the order of two seconds during the passage of the gas from the MHD channel to the steam generator. The third part of the conduit system is embodied in a connecting conduit between the dwell chamber and the lower entry of the steam generator to provide completion of the gas transfer and initiation of the MHD seed condensation.

The invention further contemplates that the interior walls of the transition conduit, dwell chamber, and connecting conduit comprise water-cooled refractory. The water absorbing the heat of the refractory is connected as preheated feedwater for the steam generator.

Other objects, advantages, and features of this invention will become apparent to one skilled in the art upon consideration of the written specification, appended claims, and attached drawings.

BRIEF DESCRIPTION OF THE DRAWINGS

FIG. 2 is an isometric of the transition conduit of FIG. 1;

FIG. 3 is a sectioned elevation of the conduit of FIG. 2;

FIG. 4 is a sectioned elevation of the connecting conduit of FIG. 1;

FIG. 5 is a section of FIG. 4 along lines 5—5;

BEST MODE FOR CARRYING OUT THE INVENTION

Overview

Figure 1:
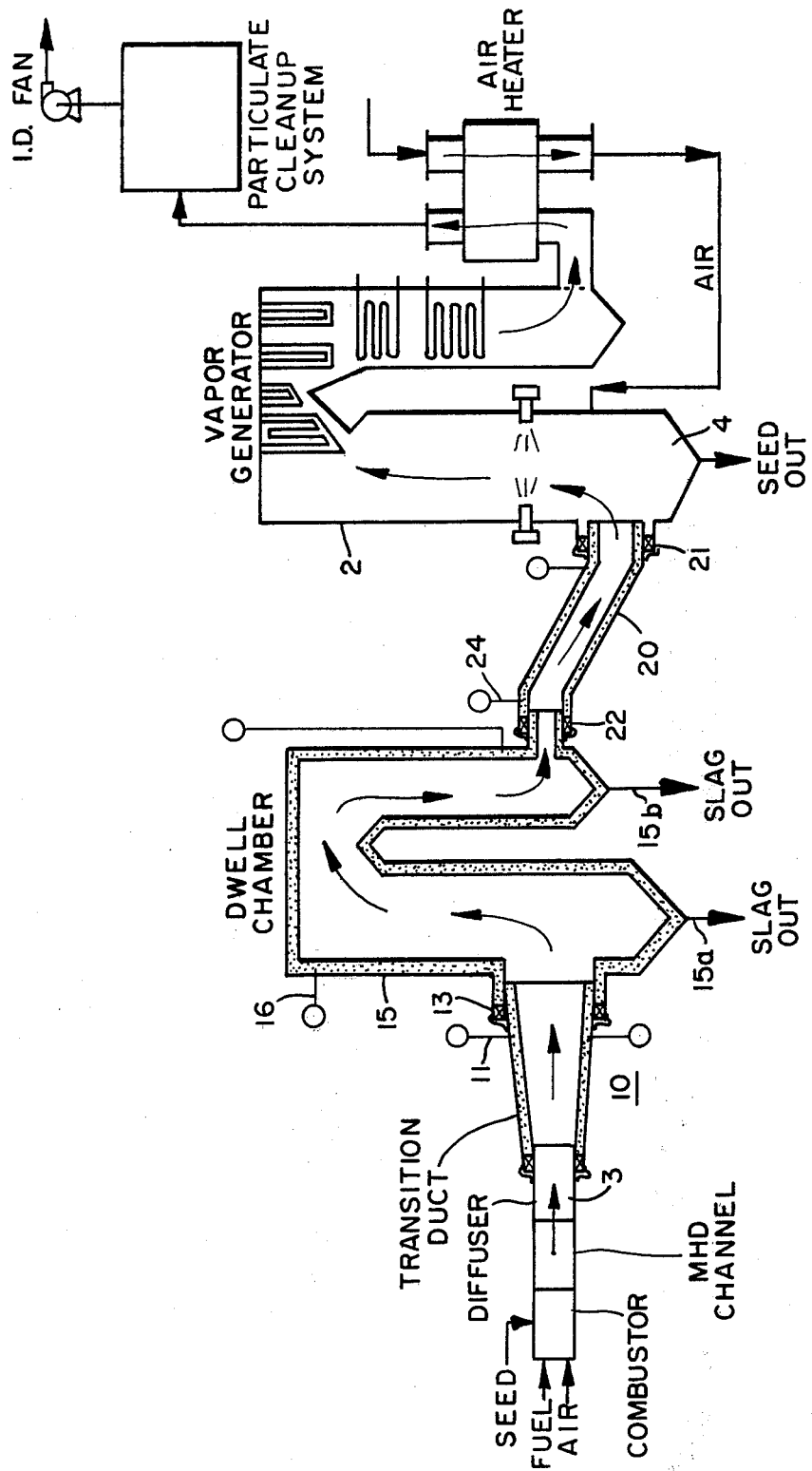
FIG. 1 is a somewhat schematic of a complete system connecting an MHD generator with a retrofitted steam generator and embodying the present invention.

The present invention is disclosed in association with the retrofit of an existing steam generator, or utility boiler, with an MHD channel as a source of heat. The inferences from the term "retrofit" are not, in any way, to limit the scope of the invention whose concept is centered in the connecting conduit system between the channel and the steam generator structure. Concepts of the invention are embodied in this connecting conduit system whether the MHD channel and its connecting conduit system are offered as a retrofit package, or whether installations are initiated under an original plan of a conventional form of steam generator and MHD channel.

There are many broad problems in the proposal to significantly increase the fuel-to-electrical energy conversion efficiency of the conventional steam generator by its marriage to the MHD channel. First, in the order of importance, is the provision of sufficient dwell time for the fuel-rich output gas of the channel, during which the oxides of nitrogen ($NO_x$) are attenuated, or caused to decay, toward their equilibrium concentrations. Inextricably entwined with the first requirement is the need to reduce the velocity of the gas from the channel by providing a suitable volume variation in the connecting transition conduit. At the same time, heat is transferred from the channel gas so it will exit from the conduit system and enter the utility steam generator at a temperature compatible with the design of the heat-absorbing surfaces of the generator. Reducing the temperature of the channel gas in the conduit connection leads into directing this heat into the feedwater system of the steam generator. Finally, the reducing temperature of the Channel gas must be provided to initiate condensation of the plasma seed in the last portion of the conduit connection which is the beginning of the seed recovery flow-train extending through the steam generator system.

The present disclosure deliberately avoids detailed description of the MHD channel. The theory and operation of this device is found elsewhere. The channel is unique in its production of gas with temperatures above 4,000° F. at velocity values in the supersonic range. Further, the so-called "seed", which is an alkali metal, usually potassium, is to be recovered as it condenses at the lower temperatures of the steam generator. Nevertheless, in the present disclosure, the channel is essentially a source of heat from gas which is directed and processed by the structure in which the present invention is embodied. This structure links the channel to the lower portion of the steam generator and provides the linkage and processing with structures that are unique in this art.

Not to be neglected, there must also be provided the induction for combustion air into the steam generator to complete the combustion in the channel gas. This induction is, logically, provided by means of ports in the conventional fossil fuel burners in the retrofitted steam generator. Companion to the seed recovery train is the slag removal train which begins in the conduit connection and continues through the steam generator system.

The basic groundrules set forth for operation of this retrofitted conversion include: when the MHD channel is out of service, the boiler can be operated as a conventional unit on fossil fuel with no derating; the existing feed-water heater and extraction arrangement of the present turbine cycle is maintained in the interest of simplicity; and the converted unit will comply with existing and/or anticipated environmental regulations for the area in which it is installed. The diffuser of the channel is expected to discharge gas at substantially 3800° F. into a water-cooled transition conduit as the first element of the connection between channel diffuser and the steam generator. The outlet end of the transition conduit is inserted into a refractory-lined dwell furnace, or chamber. It is in this furnace, or chamber, that the channel gas is cooled under reducing conditions to substantially 2900° F. Finally, the furnace is connected to the existing generator with a water-cooled conduit. In the steam generator, secondary air is injected through the burner ports, or windboxes, to complete combustion of the fuel and protect the burners. After leaving the generator, the gas passes through an air heater, a particulate removal system, and into an induced draft fan.

The Scope of FIG. 1

FIG. 1 is designed to give a setting for the conduit connecting structure between the MHD channel 1 and the steam generator 2. The sources of fuel and combustion-supporting fluid for channel 1 are not disclosed. Channel 1 terminates in a so-called diffuser section 3 from which is discharged vaporized products of combustion at the velocities approaching supersonic values and temperatures at or near 3800° F. These products of combustion are conducted by the inventive embodiment to the lower chamber 4 of generator 2. These products are expected to ascend from chamber 4 and deliver their sensible heat to the feed water in the tubes of the waterwalls to generate steam which is the ultimate product of the generator system. Of course, the steam is used to drive a turbine which is coupled to an electric generator. The output of this electric generator, not shown, is the form of energy into which the heat of the channel output gas is converted. The electrical energy output of the steam-driven electric generator is added to the electrical energy output of the channel as the total energy from the retrofitted generator. It is the amount of the electrical energy from the channel which gives the significant increase of the total energy output which justifies the marriage of the channel to the steam generator when compared with the output of the steam generator fired solely by fossil fuel. The channel output gas delivered to the chamber 4 of the steam generator must have a temperature compatible with the design temperature of the steam generator. The multiple factors in the design of the steam generator limit the temperature range of the sensible heat to which the feed water is exposed in the generator. Therefore, the conduit connection in which the invention is embodied must process the output gas of channel 1 by lowering its temperature to the level required by generator 2. In an actual reduction to practice, it will be assumed that the 3800° F. output temperature of channel 1 will be reduced to substantially 2900° F. at the input to chamber 4.

At the lower temperatures reached as the gas approaches chamber 4, seed begins to condense on the relatively cool wall surfaces of the conduit connection. Approximately 20% of the total seed is recovered in chamber 4, the remaining 80% being captured downstream at other stations in the seed train.

A principal function of the structure embodying the invention is to provide a residence time for the gas as it reduces from 3800° F. to 2900° F. Dwell time in the order of two seconds under reducing conditions is required to attenuate the nitrogen oxide content of the gas flowing through the system. The existence of $NO_x$ in the exhaust gas of all energy conversion systems is of increasing concern to environmental protection agencies. Therefore, the present invention provides a flow path for the gas discharge of channel 1 to chamber 4 of sufficient length and volume to maintain a reducing atmosphere in which the oxides of nitrogen will decay toward their equilibrium concentrations. The invention is embodied in the conduit connecting structure which will be considered in its three sections.

Transition Conduit 10

The first section of the embodiment of the invention is transition conduit 10. The entrance of this conduit connects directly to the output of diffuser 3 and is shaped and arranged to provide an increasing volume in the direction of the flow of gas through it.

In effect, the gas discharged from channel 1 is confined and directed in its flow but is provided a continuously enlarging volume by the transition conduit 10.

Presently, the more simple form for the internal volume of conduit 10 is that of the frustum of a cone. However, it is conceivable that manufacturing techniques and available material may establish other cross-sectional shapes for the transition conduit which will also provide an equivalent expanding volume for the gas flow. By whatever specific form, transition conduit 10 initiates the decrease in velocity by the progressively increasing volume it provides.

The internal walls of transition conduit 10 are comprised of water-cooled refractory. A combination of water-cooled walls which support refractory withstands the high temperature of the channel gas and extracts heat from it in the steps of reducing its temperature for insertion into chamber 4.

The connection between the diffuser section 3 and the entrance to conduit 10 is in the form of a sleeve. In short, the end of diffuser 3 is arranged to slide within the larger diameter of the entrance to conduit 10 and a mechanical seal 12, making this connection gas-tight. It is presently contemplated that the discharge end of conduit 10 will be sized to insert within the sleeve opening of dwell chamber. A seal 13 is provided similar to seal 12.

Dwell Chamber 15

Dwell chamber, or furnace, 15 is disclosed as having the form of a vertical tower, baffled to provide two parallel passes for the gas flow from channel 1. It is expected that the volume of this chamber 15 and the length of its two passes will provide both the time and velocity reduction for nitrogen oxide attenuation.

Each pass of vertical chamber 15 has a hopper with which slag may be tapped from the chamber 15. Arrows 15a and 15b indicate the removal of slag from the hoppers at the bottoms of the dwell chamber passes. Specific design conditions will dictate the height of this vertical chamber 15. The disclosure of the invention clearly provides an arrangement, or path length and volume, for the channel gas passing through the chamber.

As with transition duct 10, the internal walls of chamber 15 are provided water-cooled refractory. Fusion-welded tube panels with studs form the framework for support of the refractory which is in direct contact with the gas passing through chamber 15. The exit of this chamber is connected to the third embodying element of the invention with which the channel 1 gas is delivered to chamber 4.

Connecting Conduit 20

Connecting conduit 20 is, in overview, as simple a conduit from dwell chamber 15 to steam generator chamber 4 as transition conduit 10. There are several functions performed by connecting conduit 20 but its basic function is the simple conveyance of channel 1 gas from dwell chamber 15 to generator chamber 4.

It is expected that the entrance to chamber 4 will vary individually with each specific form of steam generator 2 retrofitted. In retrofit prospects, the entrance may be provided as substantially larger than the exit from dwell chamber 15. Therefore, the connecting conduit 20 also provides a progressively increasing volume as did transition conduit 10. Beyond this generalization, specific design requirements will establish the dimensions of the structures.

It is expected that both dwell chamber 15 and steam generator structure 2 will be suspended from points well above ground level on frameworks. In effect, as these volumes of chamber 15 and generator 2 have their thermal loadings varied, their lower portions will move vertically and horizontally distances great enough to require adjustability in their connections to conduit 20. Sleeve connections at each end of conduit 20 are quite similar to the sleeve connections of conduit 10. These sleeve arrangements, together with their mechanical seals 21 and 22, will provide the spatial adjustment which will maintain the connections gas-tight while accommodating the vertical and horizontal movements of dwell chamber 15 and steam generator 2.

Connecting conduit 20 is a comparatively massive, heavy structure. It is expected that this conduit will be supported on constant load-spring hangers. Supported resiliently, the conduit will perform its basic function of directing the channel gas from chamber 15 to chamber 4.

Again, it is expected that conduit 20 will be water cooled by tube panels. That is, the refractory contacting the gas will be cooled by the supporting tubes. The approximate temperature drop of the gas from the diffuser exit to the chamber 4 entrance will be in the order of 1000° F. More specifically, the exit temperature will be compatible with the design of the steam generator 2.

FIGS. 2 and 3—Transition Conduit

FIG. 1 disclosed transition conduit 10 in its relationship to channel 1 and chamber 15. FIGS. 2 and 3 disclose more details than could have been conveniently depicted in FIG. 1.

The isometric of FIG. 2 dramatically discloses the flared, conical frustum body of conduit 10. The figure is sectioned to disclose an arrangement of the water tubes 25 which form the framework on which refractory 26 is mounted. As the tubes 25 both support the refractory 26 and extend through the refractory, the fluid passed through the tubes absorb the heat of the channel gas passed through conduit 20, thereby cooling the refractory as a wall.

FIG. 3 is companion to FIG. 2 in disclosing the overall configuration of conduit 10 with refractory 26 supported by tubes 25. Additionally, FIG. 3 discloses the insertion of diffuser 3 into the smaller end of conduit 10 and the insertion of the larger end of conduit 10 into the opening of dwell chamber 15.

In the actual reduction to practice, the overlap of the conduit 10 ends with the diffuser and dwell chamber 15 opening are in the order of 6 feet in length. Mounted within the annulus formed by the sleeve connection is seal 12 and seal 13. Details of the seals need not be disclosed. Material adequate for sealing at the expected temperatures in these regions is available.

FIGS. 4 and 5—Connecting Conduit

FIGS. 4 and 5 are enlargements of the FIG. 1 disclosure of this structure. The specific design of connecting conduit 20 will be governed by the form of the retrofitted steam generator to which it is connected. More often than not, the entire lower portion of steam generator 2 will have to be redesigned to accommodate the linkup with the exhaust end of conduit 20. Therefore, the exact form of conduit 20 is difficult to generalize.

As in transition conduit 10, the internal walls of conduit 20 are formed of refractory 30 supported upon tubes 31. Waterflow, through tubes 31, absorb heat from channel 1 gas passing through conduit 20. This heat, along with the heat absorbed in both dwell chamber 15 and transition conduit 10, is routed into the feedwater system of generator 2.

A general expectation is that the conduit 20 will have its main length inclined downward toward its connection with chamber 4. This inclination is to provide for the gravitation of the condensing seed into chamber 4.

Seals 21 and 22 at the ends of conduit 20 are similar to seals 12 and 13 at the ends of transition conduit 10. These seals are readily arranged to both prevent the escape of the channel 1 gas, and to consistently maintain this sealing function as the structure of both dwell chamber 15 and generator 2 move under their respective thermal loads.

Also, in generalization, FIG. 5, taken along lines 5—5 in FIG. 4, support the expectation of conduit 20 being preferably rectangular in cross-section. Of course, this geometrical shape may be somewhat driven to subjective distortion at the lower end of conduit 20 in order to form its discharge into chamber 4.

Figure 6:
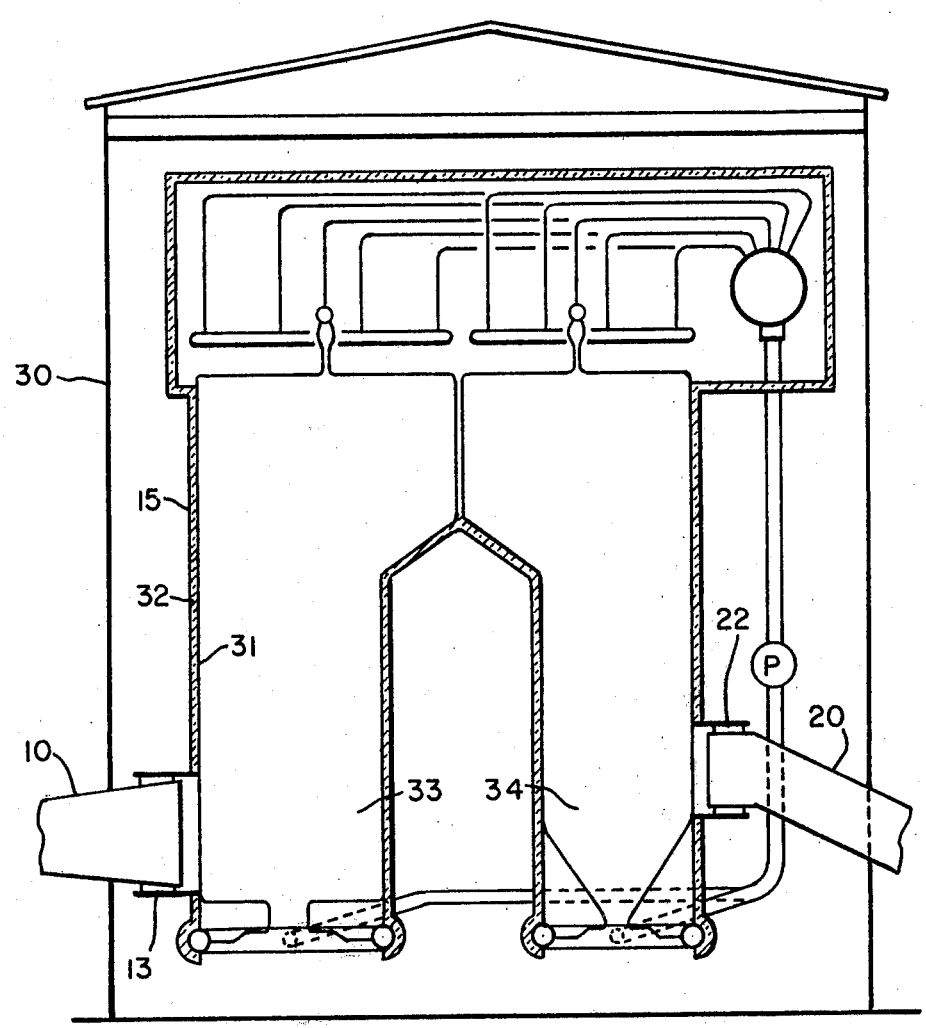
FIG. 6 is a partially sectioned elevation of the dwell chamber of FIG. 1.

FIG. 6—Dwell Chamber 15

Even from the somewhat schematic drawing of FIG. 1, it is apparent that the dwell chamber, or furnace, is a massive structure. It must have the internal capacity to give significant delay in the travel of channel gas through the length of its internal path.

Extending generally upward, the shell of chamber 15 is supported by framework 30. It is desired to suspend these structures, having large thermal loadings, from their upper portions. This suspension from the surrounding building, or framework, 30 leaves the lower portion of the chamber extending downward toward the ground, its distance from the ground varying in accordance with its change in thermal load.

With the lower portion of chamber 15 shifting vertically, and horizontally, under its thermal load change, its connections to transition conduit 10 and connecting conduit 20 must have seals at 13 and 22 which will accommodate this movement. As with the conduits, chamber 15 has water-cooled refractory 31 through which water-bearing tubes 32 extend in support. Otherwise, internal arrangement of chamber 15 provides upwardly extending pass 33 and downwardly extending pass 34 as the required path length to give the delay in channel gas travel. On the lower end of each pass 33 and 34 are hopper bottoms through which ash is removed. Gas temperatures through the dwell chamber are high enough that the only condensed compounds are mineral matter from the fuel which is collected in the hopper bottoms in each furnace pass and removed as ash therefrom.

Of course, the tubes, whose water cools the refractory, are connected to a system in common with the tubes of conduits 10 and 20 so that all of the water passed through this tube system can absorb the heat from the channel gas.

To control the degree of thermal shock to the water-cooled refractory of the dwell chamber, burners may be installed to fire through the walls. When the unit is started up and shut down, the heat from these wall burners is regulated to maintain control of the temperature gradient of the water-cooled refractory walls and avoid their failure due to thermal shock.

Figure 7:
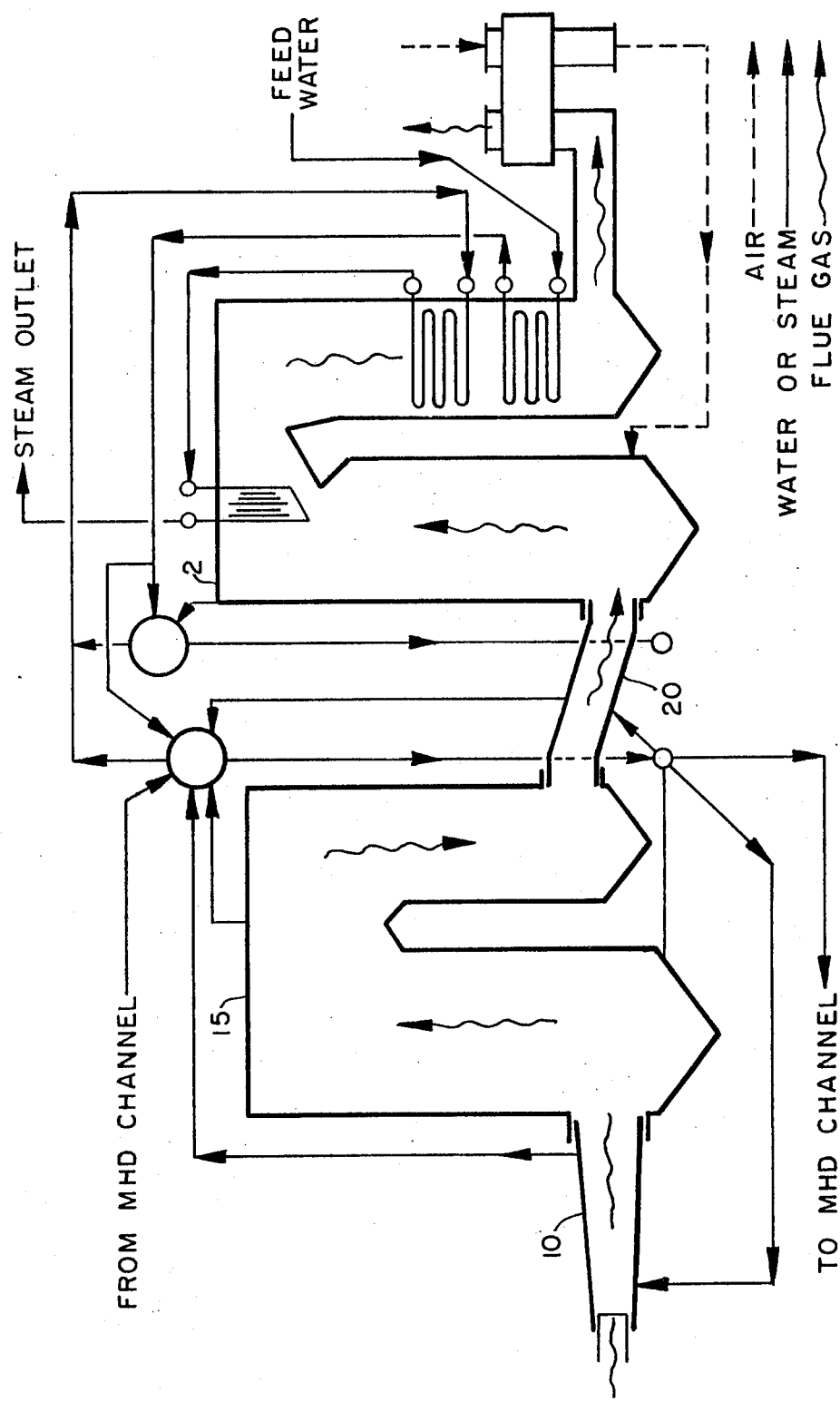
FIG. 7 is similar to FIG. 1 in which the water tubes of the conduit for the channel gas are connected to the waterwall tubes of the steam generator.

FIG. 7—Feedwater System

FIG. 7 is to disclose and dramatize the fact that the heat extracted from channel gas is directed into the water of generator 2 to the end of converting this water to steam. Therefore, the drawing discloses the headers of conduits 10 and 20 connected to the headers of chamber 15 and generator 2. It is expected that feedwater will be first passed through the tubes of the waterwalls of generator 2. From that point, the generation of steam in generator 2 is a well-understood practice. Further, the super-heating and reheating of this steam in preparation for its use in turbines is a conventional arrangement and need not be elaborated in this disclosure.

Conclusion

The advent of the MHD channel has excited the utility industry over its possibilities for significant increase in the efficiency of generating electrical energy. A direct conversion of the fuel to the channel is an awe-inspiring achievement. Further, the utilization of the high velocity, high temperature gas output from the channel has seized the imagination of designers of utility boilers. The marriage of mutual convenience between the channel and the steam generator is beginning to emerge as practical.

Of course, initial design with a matching channel and boiler is feasible. However, close upon the heels of this ambition is a concept of retrofitting existing utility steam generators. This invention furthers that objective.

As outlined in the foregoing specifications there are many problems in bringing the peculiar form of output gas of the channel into the steam generator. The lower portion of each steam generator candidate must be custom-fitted to receive the channel gas. Then, there is the seed material condensing from the channel gas. Provisions for recovery of this seed from the bottom of the steam generator, and other stations downstream from the generator gas outlet, must be designed for this purpose.

It may be desirable to periodically terminate the flow of channel gas into the steam generator and operate the generator on its original burners. It may be desirable to supplement the heat provided by the channel gas with a degree of firing from the existing burners. The completion of combustion within the channel gas as it flows up through the steam generator may necessitate bringing secondary air into the generator through the original windboxes of the original burners. These, and other, operational problems must be thoroughly appreciated. However, the basic thrust of the present invention is to convey the output channel gas from its diffuser 3 to chamber 4 of steam generator 2, as disclosed.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed with reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A connecting system between an MHD channel and a pre-existing steam generator, including,
    an MHD channel operated to produce electrical energy while discharging an output of gas containing vaporized seed and slag at a high velocity and high temperature,
    a pre-existing steam generator adapted to receive the gas output and condensed seed of the MHD channel,
    a transition conduit lined with water-cooled refractory connected directly to the MHD channel to receive the output gas and vaporized seed and slag,
    a chamber lined with water-cooled refractory connected to the output of the transition conduit to receive the channel output gas and vaporized seed and slag and sized to provide a dwell time of substantially two seconds for the gas and vaporized seed and slag in the chamber, means for removing condensed slag from the lower portion of the chamber in separation from subsequently condensed seed, and a connecting conduit connected to the output of the chamber and the input of the lower portion of the steam generator which conduit delivers the delayed output gas of the MHD channel to the lower portion of the steam generator, whereby the channel gas is delayed long enough in the reducing conditions within the chamber to attenuate $NO_x$ and the hot gas of the channel has been reduced to a temperature range compatible with the design of the heat-absorbing waterwalls of the steam generator.

2. The connecting conduit system of claim 1, in which, the transition conduit is given the form which will provide an internal volume increasing the direction of flow of the output gas from the MHD channel to which the conduit is connected.

3. The connecting conduit system of claim 2, wherein, the transition conduit is in the form of the frustum of a cone, the chamber connected to the transition conduit extends vertically and is partitioned to form two parallel flow paths to provide the dwell time of at least two seconds, and the connecting conduit extended between the chamber and steam generator is inclined downwardly in completing its connection with the lower portion of the steam generator for delivery of condensing seed into the lower portion of the steam generator.

4. The connecting conduit system of claim 1, wherein, mechanical seals are provided at each end of the connecting conduit which will maintain their gas-sealing effectiveness with the chamber and lower portion of the steam generator as the chamber and generator shift their relative positions in accordance with variations of their thermal loads.

5. The connecting system of claim 1, in which, the water-cooling systems for the transition conduit and dwell chamber and connecting conduit are supplied feed water for the steam generator.

6. The water-cooling system of claim 5 is sized with a form and supplied with feed water to lower the temperature of the output gas of the MHD channel in order to deliver the gas to the lower portion of the steam generator at the designed temperature of the waterwalls of the steam generator.

7. The connecting conduit system of claim 1, including, slip connections mechanically sealed between the transition conduit and the MHD channel and at both ends of the connecting conduit.

* * * * *